United States Patent [19]

England

[11] Patent Number: 5,028,294

[45] Date of Patent: Jul. 2, 1991

[54] WELDING DIE FOR APPLIQUE ARTICLES

[75] Inventor: Douglas R. England, Lutterworth, England

[73] Assignee: Fabrex Limited, Leicestershire, Great Britain

[21] Appl. No.: 357,973

[22] Filed: May 26, 1989

[30] Foreign Application Priority Data

May 28, 1988 [GB] United Kingdom ............... 8812787

[51] Int. Cl.$^5$ ............................................. B32B 31/18
[52] U.S. Cl. ................................... 156/515; 156/251; 156/530
[58] Field of Search ............... 156/251, 515, 518, 530, 156/261

[56] References Cited

U.S. PATENT DOCUMENTS

| | | | |
|---|---|---|---|
| 2,686,556 | 8/1954 | Gerber et al. | 156/515 |
| 3,334,004 | 8/1967 | Faust et al. | 156/515 |
| 3,758,358 | 9/1973 | Kuroda | 156/515 |
| 4,268,338 | 5/1981 | Peterson | 156/515 |

Primary Examiner—Caleb Weston
Attorney, Agent, or Firm—Renner, Otto, Boisselle & Sklar

[57] ABSTRACT

A die for use in heat welding a plastic motif to a textile base as a first welding ledge extending along a first, substantially planar face of the die, the welding ledge having a coplanar welding surface lying at least 4 mm. above the die face and having a cutting edge projecting above the welding surface to a height of at least 0.3 mm. The width of the welding surface is not less than 0.5 mm and is preferably between 1.5 mm and 3 mm. The die also has further welding ledges on which the welding surface extends the full width of the ledge. Each welding surface serves to weld the plastic material to the textile while the cutting edge severs excess material from the plastic motif along a welded line.

6 Claims, 2 Drawing Sheets

WELDING DIE FOR APPLIQUE ARTICLES

The present invention relates to the welding of applique articles.

BACKGROUND OF THE INVENTION

1. Field of the Invention

The welding of plastic motifs, known as applique articles, to textiles using high-frequency welding machines is a process which, in itself, is not new and has been carried out for some years. However, it is not a straightforward process and there are a considerable number of problems inherent in the process which make it difficult to attain a high quality end product.

One factor, for example which determines the quality of the end product is the evenness of the weld securing the plastic motif to the fabric. In the welding process itself, it is esential that the plane of the die surface is parallel with the support for the garment to ensure an even pressure and contact of the die welding ledge on the plastics motif. The design of the welding ledge on the die is also important to ensure a good weld and a clean and easy separation of excess trim material from the plastic motif after welding. These and other factors are important to the quality of the end product.

2. Summary of the Invention

The present invention seeks to provide an improved die.

Accordingly the present invention provides a die for use in heat welding a die pattern on plastic material, the die having a first face; and at least one first elongate welding ledge upstanding on and extending along a peselected closed path on said face, said welding ledge having a first welding surface remote from and substantially parallel with said first face and a cutting edge projecting beyond said welding surface and extending along the length of the said closed path outwardly of said welding surface for severing said plastic material during welding.

Additionally, the height of the cutting edge of the first face is at least 4 mm, the width of the welding surface is at least 0.5 mm, the width of the welding ledge lies in the range of 1.5 mm to 3.0 mm, and the height of the cutting edge above the welding surface lies in the range of 0.3 mm to 0.5 mm; and a lateral surface of the cutting edge facing the adjacent first welding surface forms an angle of not more than 15° to a line normal to the first welding surface.

BRIEF DESCRIPTION OF THE DRAWINGS

The present invention is further described hereinafter, by way of example, with reference to the accompanying drawings, in which.

DESCRIPTION OF THE PREFERRED EMBODIMENT

In the process for the application of an applique article to a garment a tracing of the applique design is used to manufacture an etched plate which in turn is used as a master for machining of a welding die 10.

Figure 4:
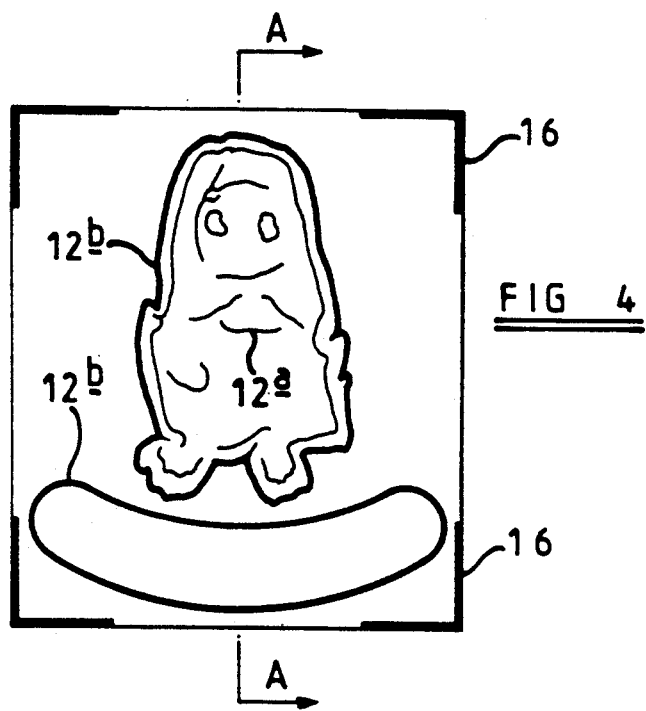
FIG. 4 is a plan view of the die showing the die face.

The black lines in FIG. 4 represent welding ledges 12 of the die. There are two forms of welding ledges required in the die. The first are welding ledges whose sole purpose is to weld the plastics motif to the fabric, and these are represented by the thinner black lines in FIG. 4. These are referred to as inner welding ledges 12a. The second are welding ledges whose purpose is both to weld the motif to the fabric and also to cut the motif along the outer edge of the welding ledge. This allows excess material of the motif to be removed after welding. These are referred to as outer welding ledges 12b although they may occur inside the edges of the motif design and are represented by the thick black lines surrounding the motif design. The outer welding ledges are wider than the inner welding ledges to allow for the formation of a cutting edge 14 and also to ensure proper welding along the cut edge of the motif.

The required width of the outer welding ledges 12b in the finished die depends on the total length of the outer welding ledges 12b in the design. The length of welding ledges 12b does not have to be measured accurately and since this is generally related to the actual size (area) of the die, the width (w) of each welding ledge can be set according to the actual size of the motif. Table I below sets out the ideal outer welding ledge widths (w).

TABLE 1

| Motif size (taken as the longest dimension of the motif) | Width (w) of the Outer Welding Ledge in finished die |
| --- | --- |
| Less than 7.5 cm | 1.5 mm |
| 7.5 to 10 cm | 2.0 mm |
| Greater than 10 cm | 3.0 mm |

The minimum width of the inner, and the welding portion of the outer welding ledges should not be less than 0.5 mm since below this a true weld cannot be guaranteed.

The die 10 is machined preferably in soft brass.

Initially, the large area of excess material in the die which surrounds the outer welding ledges 12b and any large areas within the outer welding ledges are removed. This material removed to a minimum depth of 4 mm which is satisfactory for 90% of all motif and fabric materials to be welded and ensures that the recessed parts of the die do not contact the motif during welding and cause damage.

The remaining die material within the outer welding ledges 12b is then machined to create the relatively fine detail in the die 10 and for accurate finishing of the welding ledges. Since we are concerned here with fine detail of the die, removing material between relatively close welding ledges, and accurate finishing of the welding ledges, the machining depth does not have to be as great as 4 mm and is not critical. As little as 2 mm will suffice here although the depth is typically 2.5 mm.

Once the material between the welding ledges has been machined from the die and the welding ledges accurately finished, the vertical height of the inner welding ledges 12a (those not required to carry a cutting edge) needs to be machined back by the required height of the cutting edge. Each welding ledge, except for those required to carry a cutting edge, is then machined back to a depth of 0.3 mm. This enables cutting edges 14 on the outer welding ledges 12b of 0.3 mm height to be formed which is sufficient for 90% of motif materials.

The cutting edges 14 on the outer welding ledges 12b are then formed by cutting back each welding ledge to a depth of 0.3 mm across only part of its width.

Figure 1:
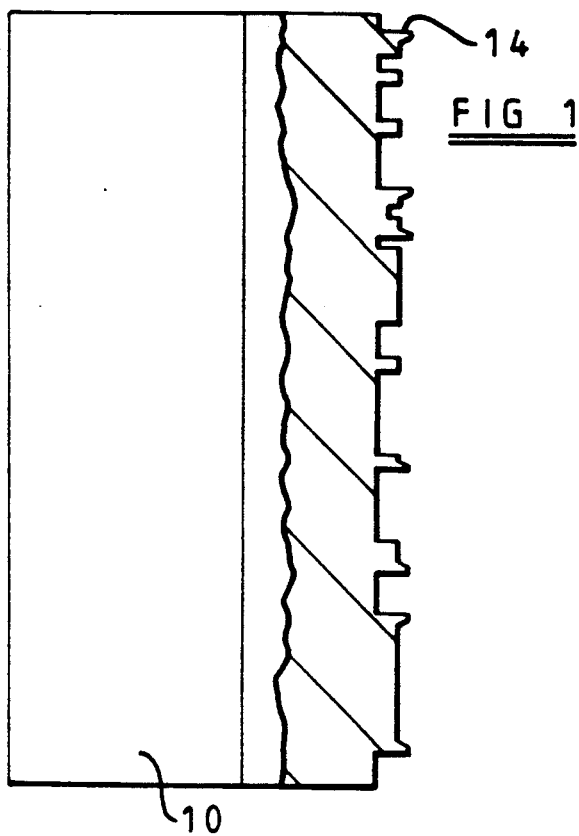
FIG. 1 is a partial section through a finished die along the line A—A of FIG. 4.
Figure 2:
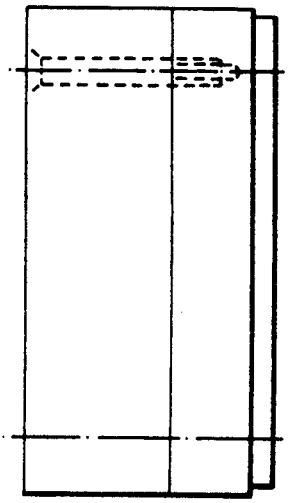
FIG. 2 is a side view of the die.
Figure 3:
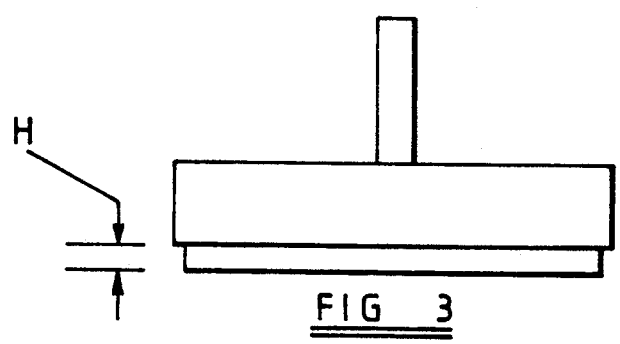
FIG. 3 is a further side view of the die turned through 90°.
Figure 5:
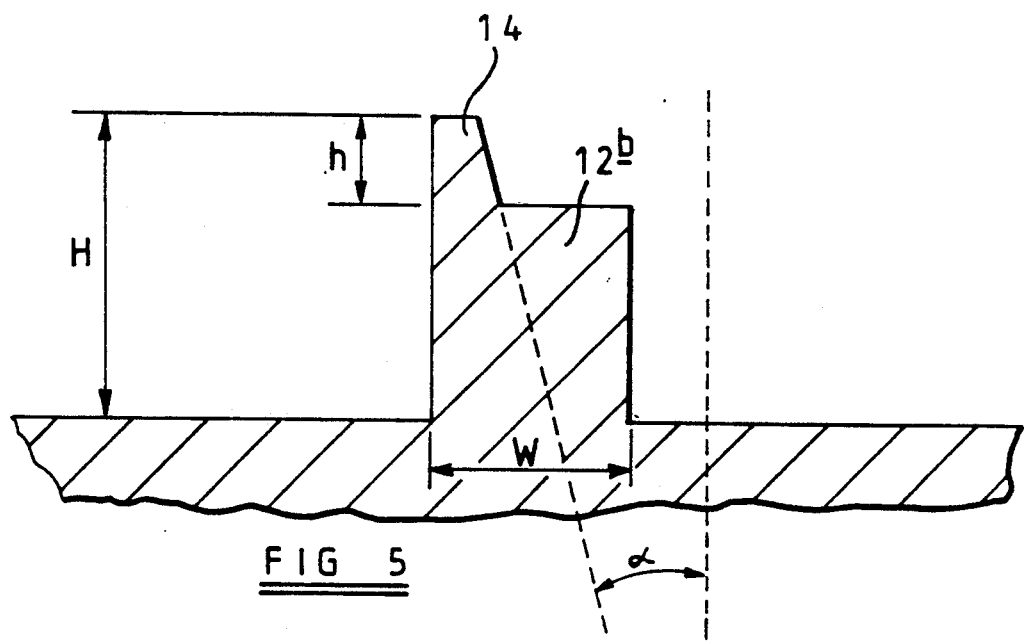
FIG. 5 is an enlarged sectional view of a welding ledge having a cutting edge.

FIG. 1 is a vertical section through a finished die 10 and as can be seen all of the welding ledges 12 and cutting edges must lie in the same respective planes. FIG. 5 is an enlarged vertical section through an outer welding ledge with a cutting edge. Table III below sets out the dimensions identified in FIG. 4.

TABLE III

| Dimension | Magnitude |
|---|---|
| α | 7.5° |
| h | 0.3 mm |
| w | See Table I above |
| H | 4.0 mm |

The above dimensions apply to the welding of 90% of materials.

However, for welding on thick resilient materials, particularly e.g., wellington boots made of plastic material, the following different dimensions are used:

TABLE IV

| Dimension | Magnitude |
|---|---|
| α | 5° |
| h | 0.5 mm |

During production of the die registration marks 16 are also formed at the four corners of the die. These assist in aligning the die with an applique motif prior to welding the motif. In order to ensure that the registration marks do not interfere with the welding process and perhaps mark or otherwise damage the plastic motif, these are cut back to a height of approximately half that of the welding ledges, typically 2 mm.

After machining, the welding ledges and cutting edge on the die are hand finished. The upper side edges of the non-cutting inner welding ledges and the inner edge of the outer welding ledges carrying the cutting edges are initially quite sharp and it is particularly important that all have their sharp edges removed by hand in order to avoid the possibility of their cutting into the plastic motif during welding and damage the motif. The inner edges of the cutting edges are also hand finished to ensure that, for example, where an outer welding ledge doubles back sharply on itself, the cutting edge is not wider than is acceptable to effect cutting.

What is claimed is:

1. A die for use in heat welding a plastic material having a die pattern onto a base, comprising: a first face; and at least one first elongate welding ledge upstanding on and extending along a preselected closed path on said face, said welding ledge having a fist welding surface substantially parallel with said first face and a cutting edge projecting beyond said welding surface and extending along the length of the said closed path outwardly of said welding surface for severing said plastic material during welding, and wherein the height of said cutting edge above said first face is at least 4 mm, the width of said welding surface is at least 0.5 mm, the width of said welding ledge lies in the range 1.5 mm to 3.0 mm, the height of said cutting edge above said welding surface lies n the range of 0.3 mm to 0.5 mm; and wherein a lateral surface of said cutting edge facing the adjacent first welding surface forms an angle of not more than 15° to a line normal to said first welding surface.

2. A die as claimed in claim 1 further comprising at least one second elongate welding ledge upstanding on said face and having a second welding surface remote from and substantially coplanar with said first welding surface, said second welding surface extending the full width of the said second welding ledge.

3. A die as claimed in claim 1 wherein said angle is not more than 10°.

4. A die as claimed in claim 1 wherein said angle is substantially 7.5°.

5. A die as claimed in claim 1 wherein the width of said first welding ledge is proportional to the longest linear dimension of said die pattern.

6. A die as claimed in claim 1 wherein said angle is substantially 5°.

* * * * *